US011265049B2

(12) United States Patent
Liu et al.

(10) Patent No.: US 11,265,049 B2
(45) Date of Patent: Mar. 1, 2022

(54) WIRELESS COMMUNICATIONS METHOD FOR TRANSMITTING PRE-CODED STREAM OUTPUTS THAT ARE GENERATED FROM APPLYING PRE-CODING TO STREAM INPUTS WITH DIFFERENT PACKET FORMATS AND ASSOCIATED WIRELESS COMMUNICATIONS APPARATUS

(71) Applicant: MEDIATEK INC., Hsin-Chu (TW)

(72) Inventors: Hsuan-Yu Liu, Hsin-Chu (TW);
Hung-Tao Hsieh, Hsinchu (TW);
Tung-Sheng Yang, Hsinchu (TW);
Pu-Hsuan Lin, Hsinchu (TW);
Wen-Hsien Chiu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/583,180

(22) Filed: Sep. 25, 2019

(65) Prior Publication Data

US 2020/0136687 A1 Apr. 30, 2020

Related U.S. Application Data

(60) Provisional application No. 62/753,120, filed on Oct. 31, 2018.

(51) Int. Cl.
*H04B 7/0456* (2017.01)
*H04L 5/00* (2006.01)
(Continued)

(52) U.S. Cl.
CPC ......... *H04B 7/0456* (2013.01); *H04B 7/0452* (2013.01); *H04L 5/0007* (2013.01); *H04W 84/12* (2013.01)

(58) Field of Classification Search
CPC ... H04B 7/0456; H04B 7/0452; H04L 5/0007; H04W 84/12
See application file for complete search history.

(56) References Cited

U.S. PATENT DOCUMENTS 9,762,302 B1 * 9/2017 Shaked ............... H04B 7/0617
2007/0211813 A1 9/2007 Talwar
(Continued)

FOREIGN PATENT DOCUMENTS

CN 105723668 A 6/2016
CN 103534967 B 12/2017
(Continued)

OTHER PUBLICATIONS

Nokia, "Linear Precoding for single stream transmission from 2TX antennas", 3GPP TSG RAN WG1 Meeting #46, R1-062355, Aug. 28,-Sep. 1, 2006, Tallinn, Estonia, pp. 1~6.

*Primary Examiner* — Christine Ng
(74) *Attorney, Agent, or Firm* — Winston Hsu

(57) ABSTRACT

A wireless communications method includes: obtaining a plurality of stream inputs, wherein the stream inputs include a first stream input complying with a first packet format and a second stream input complying with a second packet format, and the second packet format is different from the first packet format; applying pre-coding to the stream inputs to generate a plurality of pre-coded stream outputs, respectively; and performing wireless transmission upon the pre-coded stream outputs, wherein downlink Multi-User Multiple-Input Multiple-Output (MU-MIMO) transmission is involved in the wireless transmission of the pre-coded stream outputs.

10 Claims, 6 Drawing Sheets

(51) Int. Cl.
*H04B 7/0452* (2017.01)
*H04W 84/12* (2009.01)

(56) References Cited

U.S. PATENT DOCUMENTS

| | | | | |
|---|---|---|---|---|
| 2011/0176631 | A1* | 7/2011 | Tu | H04B 7/0452 375/267 |
| 2013/0128807 | A1* | 5/2013 | Vermani | H04L 27/2602 370/328 |
| 2014/0177747 | A1* | 6/2014 | Ruiz Delgado | H04L 5/0053 375/267 |
| 2015/0071272 | A1* | 3/2015 | Vermani | H04B 7/0452 370/338 |
| 2015/0334708 | A1* | 11/2015 | Lee | H04W 72/0446 370/329 |
| 2017/0099089 | A1* | 4/2017 | Liu | H04L 25/022 |
| 2017/0222698 | A1* | 8/2017 | Lange | H04B 7/0456 |
| 2017/0373816 | A1* | 12/2017 | Son | H04L 5/0053 |
| 2018/0167128 | A1* | 6/2018 | Kinamon | H04B 10/40 |
| 2018/0249506 | A1* | 8/2018 | Amiri | H04W 74/0816 |
| 2018/0337713 | A1* | 11/2018 | Elsherif | H04B 7/0417 |

FOREIGN PATENT DOCUMENTS

| | | |
|---|---|---|
| CN | 107683621 A | 2/2018 |
| CN | 108141231 A | 6/2018 |
| CN | 108293241 A | 7/2018 |
| CN | 109922477 A | 6/2019 |
| WO | 2016/154951 A1 | 10/2016 |
| WO | 2016/191991 A1 | 12/2016 |

* cited by examiner

_US 11,265,049 B2_

WIRELESS COMMUNICATIONS METHOD FOR TRANSMITTING PRE-CODED STREAM OUTPUTS THAT ARE GENERATED FROM APPLYING PRE-CODING TO STREAM INPUTS WITH DIFFERENT PACKET FORMATS AND ASSOCIATED WIRELESS COMMUNICATIONS APPARATUS

CROSS REFERENCE TO RELATED APPLICATIONS

This application claims the benefit of U.S. provisional application No. 62/753,120, filed on Oct. 31, 2018 and incorporated herein by reference.

BACKGROUND

The present invention relates to wireless communications, and more particularly, to a wireless communications method for transmitting pre-coded stream outputs that are generated from applying pre-coding to stream inputs with different packet formats and an associated wireless communications apparatus.

IEEE (Institute of Electrical and Electronics Engineers) 802.11 is the IEEE working group that develops Wireless Local Area Network (WLAN) standards. WLAN is now ubiquitous, with one or more of these WLAN technologies included as standard capabilities on most laptops and many smartphones. The IEEE 802.11 group has continued to improve earlier WLAN standards. For example, a newly developed WLAN standard may have one or more features that are not supported by earlier WLAN standards. It is possible that one access point (AP) is required to provide services for multiple stations that employ different WLAN standards. If a first WLAN standard has one feature that is not supported by a second WLAN standard, the AP may fail to use one packet to finish downlink transmission with station(s) using the first WLAN standard and station(s) using the second WLAN standard. Thus, there is a need for an innovative wireless communications design that is capable of combining packets that comply with different wireless communication standards (e.g., different WLAN standards) into one packet for downlink transmission over the air.

SUMMARY

One of the objectives of the claimed invention is to provide a wireless communications method for transmitting pre-coded stream outputs that are generated from applying pre-coding to stream inputs with different packet formats and an associated wireless communications apparatus.

According to a first aspect of the present invention, an exemplary wireless communications method is disclosed. The exemplary wireless communications method includes: obtaining a plurality of stream inputs, wherein the stream inputs comprise a first stream input complying with a first packet format and a second stream input complying with a second packet format, and the second packet format is different from the first packet format; applying pre-coding to the stream inputs to generate a plurality of pre-coded stream outputs, respectively; and performing wireless transmission upon the pre-coded stream outputs, wherein downlink Multi-User Multiple-Input Multiple-Output (MU-MIMO) transmission is involved in said wireless transmission of the pre-coded stream outputs.

According to a second aspect of the present invention, an exemplary wireless communications apparatus is disclosed. The exemplary wireless communications apparatus includes a digital baseband circuit and a transmit (TX) circuit. The digital baseband circuit is arranged to obtain a plurality of stream inputs, and apply pre-coding to the stream inputs to generate a plurality of pre-coded stream outputs, respectively, wherein the stream inputs comprise a first stream input complying with a first packet format and a second stream input complying with a second packet format, and the second packet format is different from the first packet format. The TX circuit is arranged to perform wireless transmission upon the pre-coded stream outputs, wherein downlink Multi-User Multiple-Input Multiple-Output (MU-MIMO) transmission is involved in said wireless transmission of the pre-coded stream outputs.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
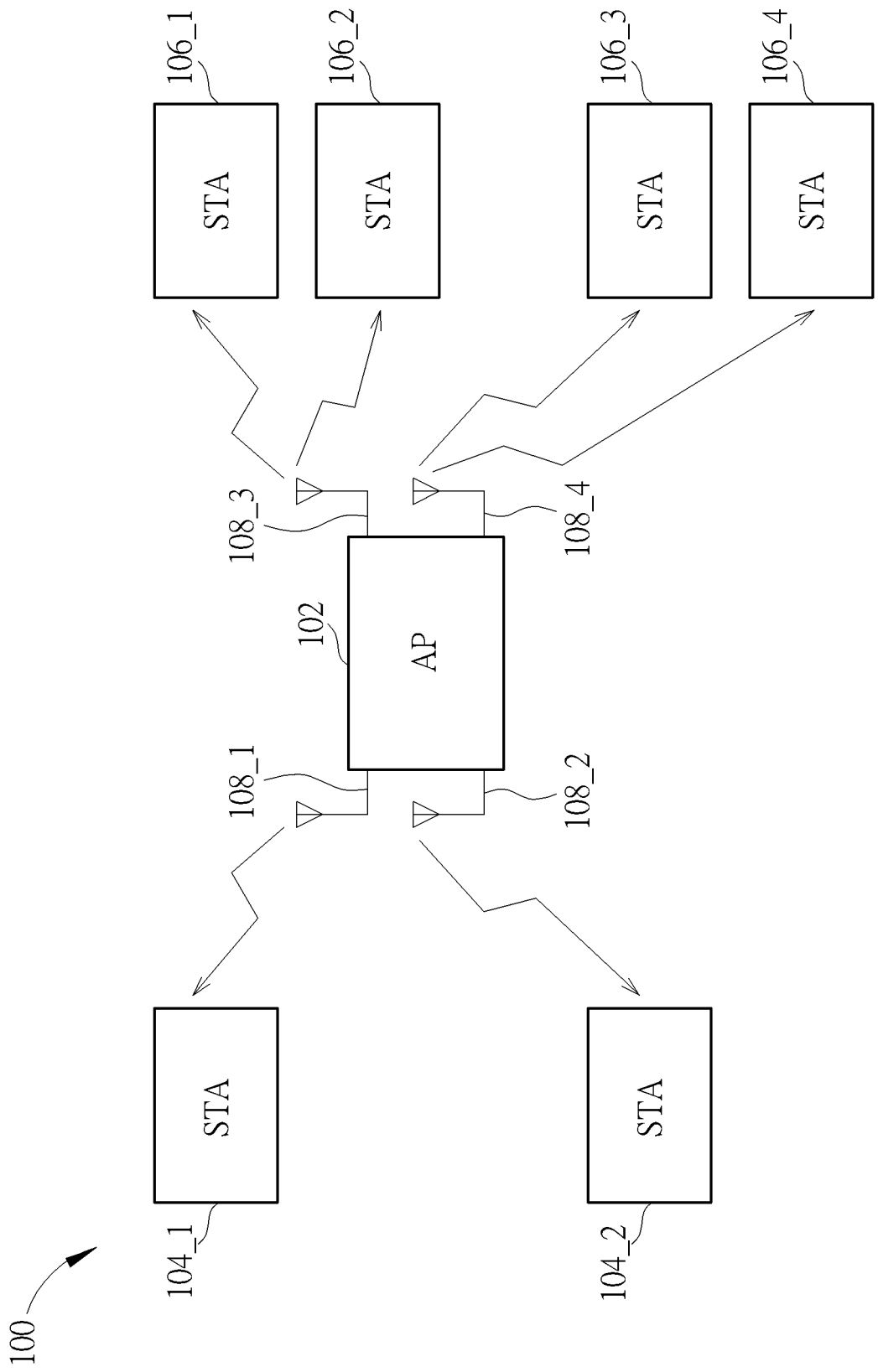
FIG. 1 is a diagram illustrating a wireless communications system according to an embodiment of the present invention.

FIG. 1 is a diagram illustrating a wireless communications system according to an embodiment of the present invention. The wireless communications system 100 includes an access point (AP) 102 and a plurality of stations (STAs) 104_1, 104_2, 106_1, 106_2, 106_3, 106_4. The AP 102 supports different wireless communications standards, including a first wireless communications standard (e.g., an earlier wireless communications standard) and a second wireless communications standard (e.g., a latest wireless communications standard). The STAs 104_1 and 104_2 support the first wireless communications standard, but do not support the second wireless communications standard. The STAs 106_1-106_4 support the second wireless communications standard that is backward compatible with the first wireless communications standard. For example, the wireless communications system 100 may be a WLAN system such as a Wireless Fidelity (Wi-Fi) system, the first wireless communications standard may be an IEEE 802.11ac standard (also named Wi-Fi 5 standard), and the second wireless communications standard may be an IEEE 802.11ax standard (also named Wi-Fi 6 standard). IEEE 802.11ax standard supports downlink Orthogonal Frequency Division Multiple Access (DL-OFDMA) and downlink Multi-User Multiple-Input Multiple-Output (DL-MU-MIMO). IEEE 802.11ac supports DL-OFDMA, but does not support DL-OFDMA. In this embodiment, the proposed wireless communications method is employed by the AP 102 for combining packets that comply with different wireless communication standards (e.g., IEEE 802.11ac standard and IEEE 802.11ax standard) into one DL-MU-MIMO packet for transmission over the air. Specifically, the AP 102 can use one DL-MU-MIMO packet to finish downlink transmission with STAs 104_1-104_2 (e.g., IEEE 802.11ac stations) and STAs 106_1-106_4 (e.g., IEEE 802.11ax stations). As shown in FIG. 1, the AP 102 has four antennas 108_1, 108_2, 108_3, and 108_4. During one MU-MIMO packet period, the AP 102 employs DL-MU-MIMO to communicate with STA 104_1 via antenna 108_1 and communicate with STA 104_2 via antenna 108_2. During the same MU-MIMO packet period, the AP 102 employs DL-MU-MIMO and DL-OFDMA to communicate with STAs 106_1-106_2 via antenna 108_3 and communicate with STAs 106_3-106_4 via antenna 108_4. Further details of the proposed wireless communications method is provided as below.

Figure 2:
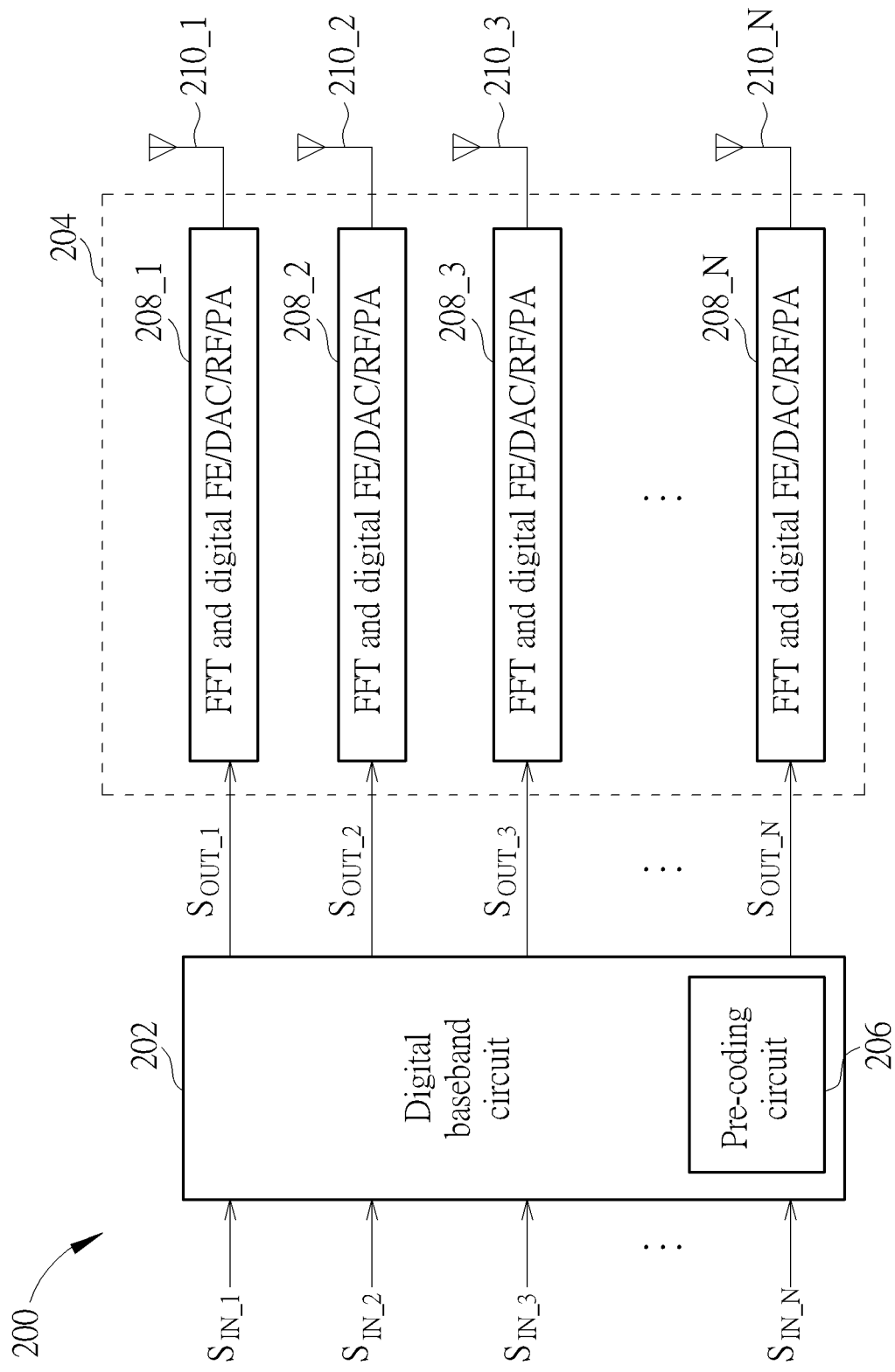
FIG. 2 is a diagram illustrating a wireless communications apparatus according to an embodiment of the present invention.

FIG. 2 is a diagram illustrating a wireless communications apparatus according to an embodiment of the present invention. In this embodiment, the wireless communications apparatus 200 includes a digital baseband circuit 202 and a transmit (TX) circuit 204. The digital baseband circuit 202 obtains a plurality of stream inputs $S_{IN}\_1$, $S_{IN}\_2$, $S_{IN}\_3$, ..., $S_{IN}\_N$, where N is a positive integer (e.g., N=4). The stream inputs $S_{IN}\_1$-$S_{IN}\_N$ may not employ the same packet format. That is, the stream inputs $S_{IN}\_1$-$S_{IN}\_N$ may include a first stream input complying with a first packet format and a second stream input complying with a second packet format that is different from the first packet format. To achieve interference avoidance for DL-MU-MIMO transmission of multiple streams, the digital baseband circuit 202 includes a pre-coding circuit 206 that is arranged for applying pre-coding to the stream inputs $S_{IN}\_1$-$S_{IN}\_N$ to generate a plurality of pre-coded stream outputs $S_{OUT}\_1$-$S_{OUT}\_N$, respectively. The TX circuit 204 performs wireless transmission upon the pre-coded stream outputs $S_{OUT}\_1$-$S_{OUT}\_N$. When the wireless communications apparatus 200 is a part of the AP 102, DL-MU-MIMO transmission is involved in the wireless transmission of the pre-coded stream outputs $S_{OUT}\_1$-$S_{OUT}\_N$. As shown in FIG. 2, the TX circuit 204 includes a plurality of TX chains 208_1, 208_2, 208_3, ..., 208_N coupled to a plurality of antennas 210_1, 210_2, 210_3, ..., 210_N, respectively. Each of the TX chains 208_1-208_N may include a fast Fourier transform and digital front-end circuit (denoted by "FFT and digital FE"), a digital-to-analog converter (DAC), a radio-frequency circuit (denoted by "RE"), and a power amplifier (PA).

Since pre-coding is applied to stream inputs $S_{IN}\_1$-$S_{IN}\_N$ that include stream inputs with different packet types, the corresponding pre-coded stream outputs $S_{OUT}\_1$-$S_{OUT}\_N$ can be transmitted to different stations in MU-MIMO manner without interference. For example, the wireless communications apparatus 200 may be a part of the AP 102 shown in FIG. 1. Hence, if pre-coding is perfect, the performance will be like in an AWGN (additive white Gaussian noise) bypass channel. Specifically, the channel between STA 104_1 and antenna 108_1 is not interfered with the channel between STA 104_2 and antenna 108_2, the channel between STA 106_1 and antenna 108_3, the channel between STA 106_2 and antenna 108_3, the channel between STA 106_3 and antenna 108_4, and the channel between STA 106_4 and antenna 108_4; the channel between STA 104_2 and antenna 108_2 is not interfered with the channel between STA 104_1 and antenna 108_1, the channel between STA 106_1 and antenna 108_3, the channel between STA 106_2 and antenna 108_3, the channel between STA 106_3 and antenna 108_4, and the channel between STA 106_4 and antenna 108_4; the channel between STA 106_1 and antenna 108_3 is not interfered with the channel between STA 104_1 and antenna 108_1, the channel between STA 104_2 and antenna 108_2, the channel between STA 106_2 and antenna 108_3, the channel between STA 106_3 and antenna 108_4, and the channel between STA 106_4 and antenna 108_4; the channel between STA 106_2 and antenna 108_3 is not interfered with the channel between STA 104_1 and antenna 108_1, the channel between STA 104_2 and antenna 108_2, the channel between STA 106_1 and antenna 108_3, the channel between STA 106_3 and antenna 108_4, and the channel between STA 106_4 and antenna 108_4; the channel between STA 106_3 and antenna 108_4 is not interfered with the channel between STA 104_1 and antenna 108_1, the channel between STA 104_2 and antenna 108_2, the channel between STA 106_1 and antenna 108_3, the channel between STA 106_2 and antenna 108_3, and the channel between STA 106_4 and antenna 108_4; and the channel between STA 106_4 and antenna 108_4 is not interfered with the channel between STA 104_1 and antenna 108_1, the channel between STA 104_2 and antenna 108_2, the channel between STA 106_1 and antenna 108_3, the channel between STA 106_2 and antenna 108_3, and the channel between STA 106_3 and antenna 108_4.

In a case where the wireless communications apparatus 200 is a part of the AP 102 shown in FIG. 1, the digital baseband circuit 202 receives stream inputs $S_{IN}\_1$, $S_{IN}\_2$, $S_{IN}\_3$ and $S_{IN}\_N$ (N=4) and generates pre-coded stream outputs $S_{OUT}\_1$, $S_{OUT}\_2$, $S_{OUT}\_3$ and $S_{OUT}\_N$ (N=4), and the TX circuit 204 transmits the pre-coded stream outputs $S_{OUT}\_1$, $S_{OUT}\_2$, $S_{OUT}\_3$ and $S_{OUT}\_N$ (N=4) via antennas 210_1, 210_2, 210_3, and 210_N (N=4), where the antennas 210_1, 210_2, 210_3, and 210_N (N=4) act as antennas 108_1, 108_2, 108_3, and 108_4, respectively. As mentioned above, the AP 102 supports different wireless communications standards, including a first wireless communications standard (e.g., an earlier wireless communications standard) and a second wireless communications standard (e.g., a latest wireless communications standard). The STAs 104_1 and 104_2 support the first wireless communications standard, but does not support the second wireless communications standard. The STAs 106_1-106_4 support the second wireless communications standard that is backward compatible with the first wireless communications standard. In this example, the first wireless communications standard may be an IEEE 802.11ac standard, and the second wireless communications standard may be an IEEE 802.11ax standard. Each of the STAs 104_1 and 104_2 supports DL-MU-MIMO, but does not support DL-OFDMA. Hence, DL-MU-MIMO is involved in wireless transmission of the pre-coded stream outputs $S_{OUT\_}1$ and $S_{OUT\_}2$. However, DL-OFDMA is not involved in wireless transmission of the pre-coded stream outputs $S_{OUT\_}1$ and $S_{OUT\_}2$. Each of the STAs 106_1-106_4 supports both of DL-OFDMA and DL-MIMO. Hence, DL-MU-MIMO and DL-OFDMA are both involved in wireless transmission of the pre-coded stream outputs $S_{OUT\_}3$ and $S_{OUT\_}N$ (N=4).

Figure 3:
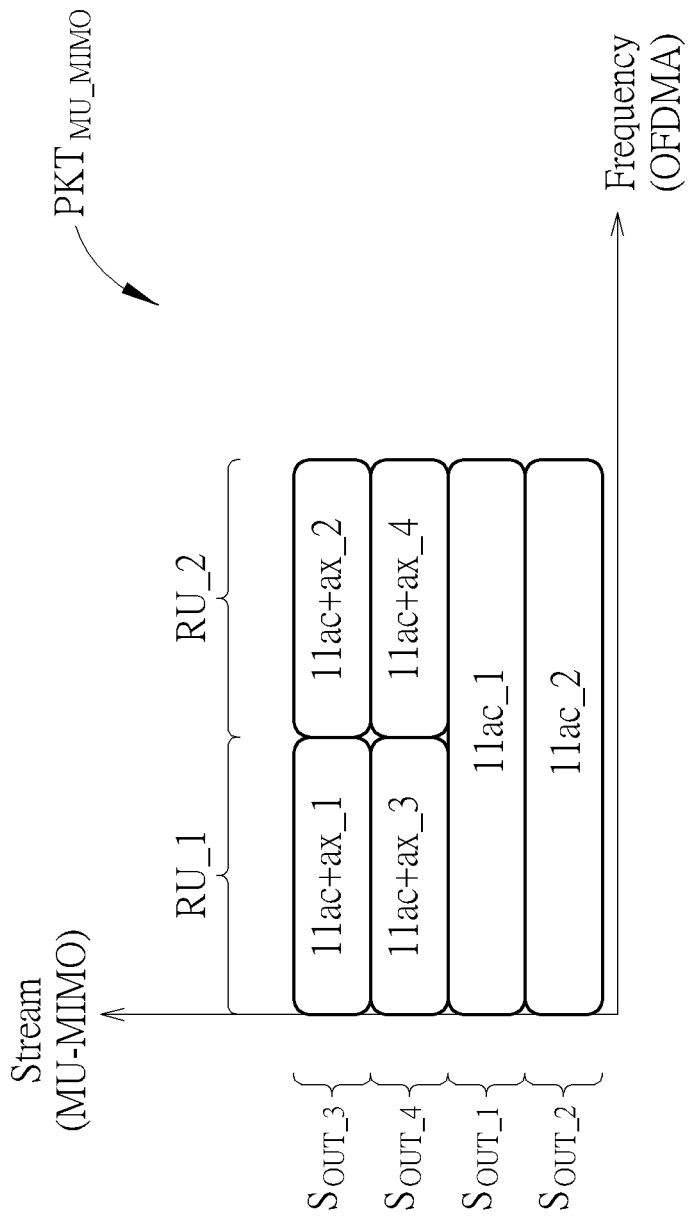
FIG. 3 is a diagram illustrating wireless transmission of one DL-MU-MIMO packet that has IEEE 802.11ac packets and IEEE 802.11ax packets combined therein according to an embodiment of the present invention.

FIG. 3 is a diagram illustrating wireless transmission of one DL-MU-MIMO packet that has IEEE 802.11ac packets and IEEE 802.11ax packets combined therein according to an embodiment of the present invention. One DL-MU-MIMO packet $PKT_{MU\_MIMO}$ includes four IEEE 802.11ax packets (denoted by "11ac+ax_1", "11ac+ax_2", "11ac+ax_3", and "11ac+ax_4") and two IEEE 802.11ac packets (denoted by "11ac_1" and "11ac_2"). Four pre-coded output streams $S_{OUT\_}1$, $S_{OUT\_}2$, $S_{OUT\_}3$ and $S_{OUT\_}4$ are transmitted via downlink in an MU-MIMO manner. The pre-coded output stream $S_{OUT\_}1$ includes the IEEE 802.11ac packet "11ac_1" that is to be transmitted to the STA 104_1. The pre-coded output stream $S_{OUT\_}2$ includes the IEEE 802.11ac packet "11ac_2" that is to be transmitted to the STA 104_2. The pre-coded output streams $S_{OUT\_}3$ and $S_{OUT\_}4$ are further transmitted via downlink in an OFDMA manner. The pre-coded output stream $S_{OUT\_}3$ includes the IEEE 802.11ax packet "11ac+ax_1" that is to be transmitted to the STA 106_1 via one resource unit RU_1, and further includes the IEEE 802.11ax packet "11ac+ax_2" that is to be transmitted to the STA 106_2 via another resource unit RU_2. The resource units RU_1 and RU_2 are allocated at non-overlapping frequency bands, respectively. The pre-coded output stream $S_{OUT\_}4$ includes the IEEE 802.11ax packet "11ac+ax_3" that is to be transmitted to the STA 106_3 via one resource unit RU_1, and further includes the IEEE 802.11ax packet "11ac+ax_4" that is to be transmitted to the STA 106_4 via another resource unit RU_2. In this example, four antennas of the AP 102 are used to achieve transmission of one MU-MIMO packet $PKT_{MU\_MIMO}$, where the AP 102 uses two antennas for transmitting four IEEE 802.11ax packets to STAs 106_1-106_4 via MU-MIMO and OFDMA, and uses two antennas for transmitting two IEEE 802.11ac packets to STAs 104_1-104_2 via MU-MIMO with no OFDMA. With proper settings of pre-coding coefficients, streams using different packet types can be transmitted at the same time without being interfered with one another. Though IEEE 802.11ac packets (which support MU-MIMO, but do not support OFDMA) are transmitted at the time the IEEE 802.11ax packets (which support MU-MIMO and OFDMA) are transmitted, transmission of IEEE 802.11ax packets is not interfered with transmission of IEEE 802.11ac packets due to pre-coding.

Figure 4:
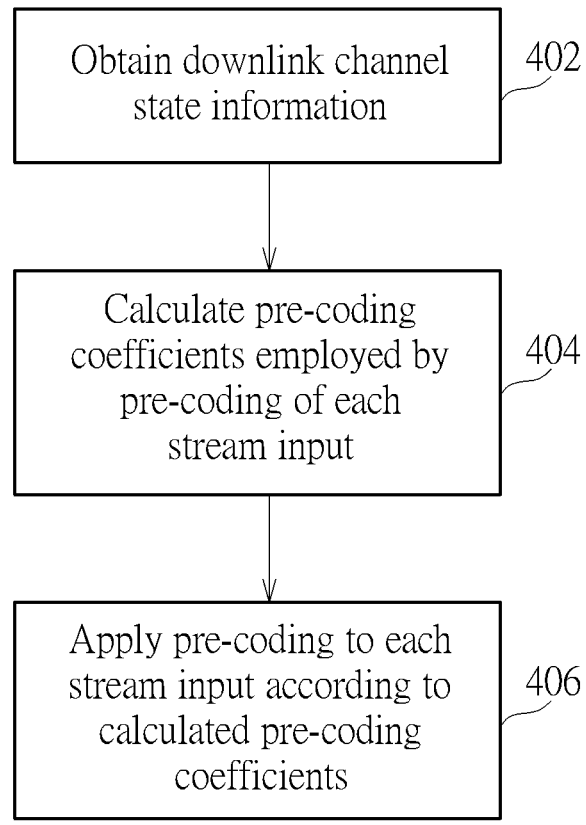
FIG. 4 is a flowchart illustrating a pre-coding method according to an embodiment of the present invention.

FIG. 4 is a flowchart illustrating a pre-coding method according to an embodiment of the present invention. At step 402, the pre-coding circuit 206 obtains downlink channel state information (CSI). For example, the wireless communications apparatus 200 may be a part of the AP 102 shown in FIG. 1, where the STAs 104_1-104_2 support the IEEE 802.11ac standard, and the STAs 106_1-106_4 support the IEEE 802.11ac standard. The AP 102 gets sounding feedback from each of the STAs 104_1-104_2 and 106_1-106_4, and refers to the sounding feedback to obtain downlink CSI associated with a corresponding channel between the AP 102 and each of the STAs 104_1-104_2 and 106_1-106_4. However, this is for illustrative purposes only, and is not meant to be a limitation of the present invention. In practice, any means capable of obtaining downlink CSI for each channel may be adopted. For example, default downlink CSI may be directly used by the pre-coding circuit 206.

At step 404, the pre-coding circuit 206 calculates a set of pre-coding coefficients employed by pre-coding of one of the stream inputs $S_{IN\_}1$-$S_{IN\_}N$ according to the downlink CSI associated with one corresponding channel between the AP 102 and one of the STAs 104_1-104_2 and 106_1-106_4.

At step 406, the pre-coding circuit 206 applies pre-coding to each of the stream inputs $S_{IN\_}1$-$S_{IN\_}N$ according to a corresponding set of pre-coding coefficients. For example, a stream input of the digital baseband circuit 202 may include a packet that has a preamble section followed by a payload section. In a first pre-coding design, pre-coding is applied to the whole packet. Hence, the pre-coding of the packet starts from a start point of the preamble section.

Figure 5:
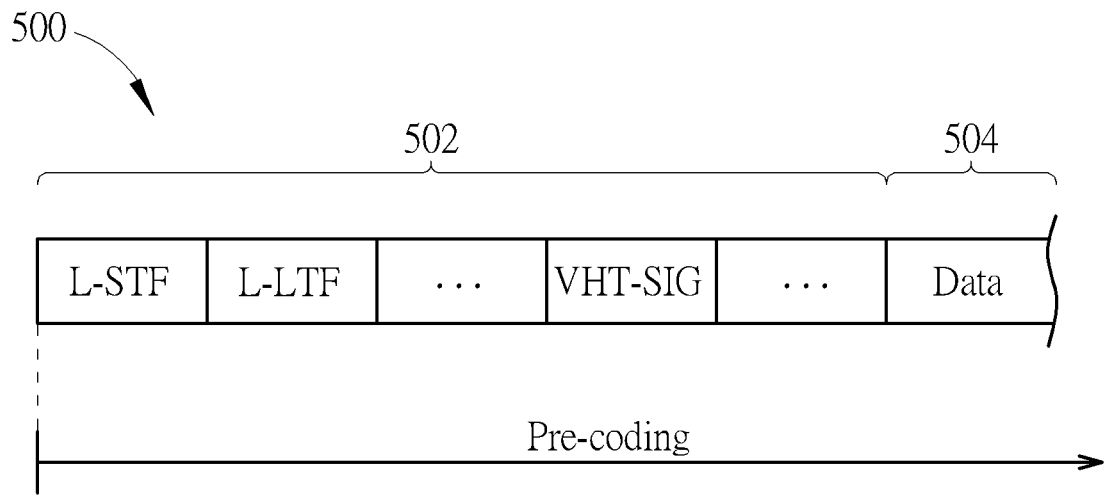
FIG. 5 is a diagram illustrating a first pre-coding design of an IEEE 802.11ac packet according to an embodiment of the present invention.

FIG. 5 is a diagram illustrating a first pre-coding design of an IEEE 802.11ac packet according to an embodiment of the present invention. The IEEE 802.11ac packet 500 includes a preamble section 502 followed by a payload section 504. The preamble section 502 includes a legacy short training field (L-STF), a legacy long training field (L-LTF), a very high throughput signal field (VHT-SIG), etc. In this example, pre-coding of the IEEE 802.11ac packet 500 starts from a start point of the preamble section 502. That is, pre-coding of the IEEE 802.11ac packet 500 starts from L-STF included in the preamble section 502.

Figure 6:
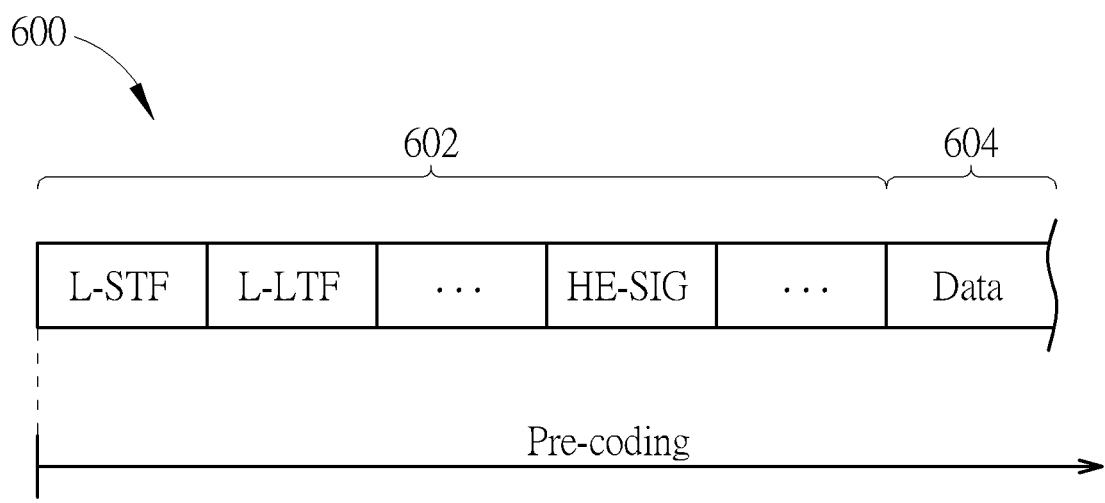
FIG. 6 is a diagram illustrating a first pre-coding design of an IEEE 802.11ax packet according to an embodiment of the present invention.

FIG. 6 is a diagram illustrating a first pre-coding design of an IEEE 802.11ax packet according to an embodiment of the present invention. The IEEE 802.11ax packet 600 includes a preamble section 602 followed by a payload section 604. The preamble section 602 includes a legacy short training field (L-STF), a legacy long training field (L-LTF), a high efficiency signal field (HE-SIG), etc. In this example, pre-coding of the IEEE 802.11ax packet 600 starts from a start point of the preamble section 602. That is, pre-coding of the IEEE 802.11ax packet 600 starts from L-STF included in the preamble section 602.

In above examples shown in FIG. 5 and FIG. 6, pre-coding is applied to the whole preamble section (particular, the whole packet) to avoid interference that may cause VHT-SIG (or HE-SIG) decoding error at the station. However, this is for illustrative purposes only, and is not meant to be a limitation of the present invention. Successful VHT-SIG (or HE-SIG) decoding at the station may still be achieved under a condition that pre-coding of L-STF is omitted. In a second pre-coding design, pre-coding is applied to only a portion of the preamble section (particular, only a portion of the packet) to avoid interference that may cause VHT-SIG (or HE-SIG) decoding error at the station.

Figure 7:
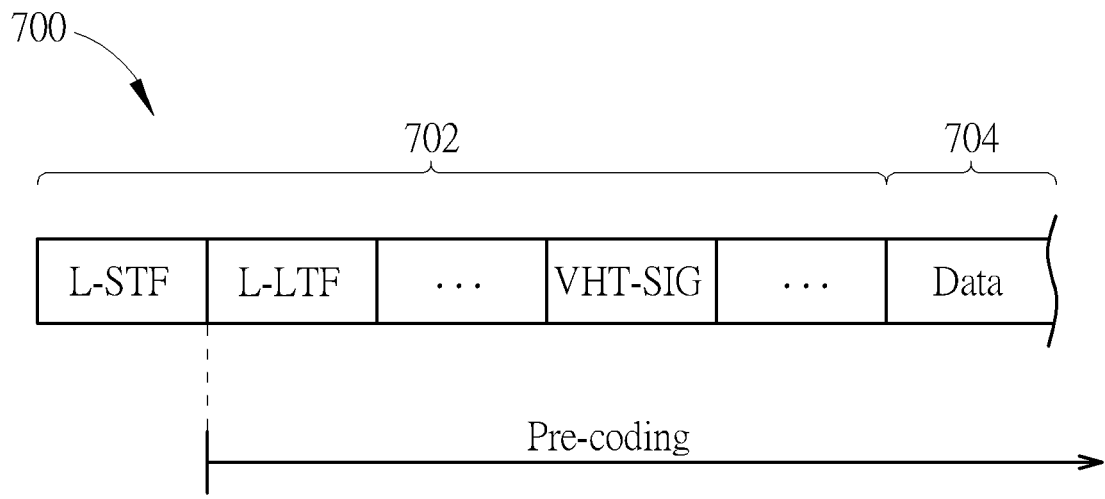
FIG. 7 is a diagram illustrating a second pre-coding design of an IEEE 802.11ac packet according to an embodiment of the present invention.

FIG. 7 is a diagram illustrating a second pre-coding design of an IEEE 802.11ac packet according to an embodiment of the present invention. The IEEE 802.11ac packet 700 includes a preamble section 702 followed by a payload section 704. The preamble section 702 includes a legacy short training field (L-STF), a legacy long training field (L-LTF), a very high throughput signal field (VHT-SIG), etc. In this example, pre-coding of the IEEE 802.11ac packet 700 starts from a specific point of the preamble section 702, where the specific point is between a start point of the preamble section 702 and an end point of the preamble section 702. As shown in FIG. 7, pre-coding of the IEEE 802.11ac packet 700 starts from L-LTF included in the preamble section 702.

Figure 8:
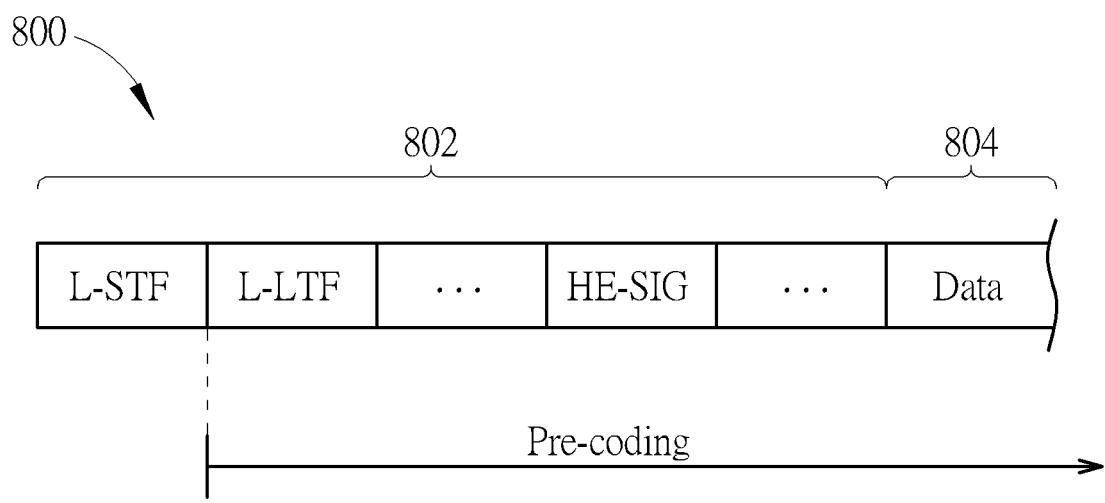
FIG. 8 is a diagram illustrating a second pre-coding design of an IEEE 802.11ax packet according to an embodiment of the present invention.

FIG. 8 is a diagram illustrating a second pre-coding design of an IEEE 802.11ax packet according to an embodiment of the present invention. The IEEE 802.11ax packet 800 includes a preamble section 802 followed by a payload section 804. The preamble section 802 includes a legacy short training field (L-STF), a legacy long training field (L-LTF), a high efficiency signal field (HE-SIG), etc. In this example, pre-coding of the IEEE 802.11ax packet 800 starts from a specific point of the preamble section 802, where the specific point is between a start point of the preamble section 802 and an end point of the preamble section 802. As shown in FIG. 8, pre-coding of the IEEE 802.11ax packet 800 starts from L-LTF included in the preamble section 802.

In above embodiments, IEEE 801.11ac packets and IEEE 801.11ax packets are combined into one DL-MU-MIMO packet for transmission after undergoing pre-coding. However, this is for illustrative purposes only, and is not meant to be a limitation of the present invention. In practice, the proposed wireless communications method has no limitations on the packet formats. For example, any wireless communications apparatus that transmits pre-coded multi-packet format streams in an MU-MIMO manner falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communications method comprising:
obtaining a plurality of stream inputs, wherein the stream inputs comprise a first stream input complying with a first packet format and a second stream input complying with a second packet format, and the second packet format is different from the first packet format;
applying pre-coding to the stream inputs to generate a plurality of pre-coded stream outputs, respectively; and
performing wireless transmission upon the pre-coded stream outputs, wherein downlink Multi-User Multiple-Input Multiple-Output (MU-MIMO) transmission is involved in said wireless transmission of the pre-coded stream outputs;
wherein the first packet format complies with a first wireless communications standard, the second packet format complies with a second wireless communications standard, the first wireless communications standard is different from the second wireless communications standard, and both of the first wireless communications standard and the second wireless communications standard support downlink MU-MIMO;
wherein one downlink MU-MIMO packet comprises the pre-coded stream outputs, and is partially transmitted with downlink Orthogonal Frequency Division Multiple Access (OFDMA) and partially transmitted without downlink OFDMA; and
wherein the first stream input comprises a packet that has a preamble section followed by a payload section, said pre-coding of the packet starts from a Legacy Long Training Field (L-LTF) included in the preamble section, and said pre-coding of the packet is not applied to a Legacy Short Training Field (L-STF) included in the preamble section.

2. The wireless communications method of claim 1, wherein the pre-coded stream outputs comprise a first pre-coded stream output that is derived from said pre-coding of the first stream input, and downlink OFDMA is further involved in said wireless transmission of the first pre-coded stream output.

3. The wireless communications method of claim 2, wherein the pre-coded stream outputs further comprise a second pre-coded stream output that is derived from said pre-coding of the second stream input, downlink OFDMA is not involved in said wireless transmission of the second pre-coded stream output, and the first pre-coded stream output and the second pre-coded stream output are transmitted via different antennas, respectively.

4. The wireless communications method of claim 1, wherein each of the first wireless communications standard and the second wireless communications standard is a Wireless Local Area Network (WLAN) standard.

5. The wireless communications method of claim 4, wherein the first wireless communications standard is an Institute of Electrical and Electronics Engineers (IEEE) 802.11ac standard, and the second wireless communications standard is an IEEE 802.11ax standard.

6. A wireless communications apparatus comprising:
a digital baseband circuit, arranged to:
obtain a plurality of stream inputs, wherein the stream inputs comprise a first stream input complying with a first packet format and a second stream input complying with a second packet format, and the second packet format is different from the first packet format; and
apply pre-coding to the stream inputs to generate a plurality of pre-coded stream outputs, respectively; and
a transmit (TX) circuit, arranged to perform wireless transmission upon the pre-coded stream outputs, wherein downlink Multi-User Multiple-Input Multiple-Output (MU-MIMO) transmission is involved in said wireless transmission of the pre-coded stream outputs;
wherein the first packet format complies with a first wireless communications standard, the second packet format complies with a second wireless communications standard, the first wireless communications standard is different from the second wireless communications standard, and both of the first wireless communications standard and the second wireless communications standard support downlink MU-MIMO;
wherein one downlink MU-MIMO packet comprises the pre-coded stream outputs, and is partially transmitted with downlink Orthogonal Frequency Division Multiple Access (OFDMA) and partially transmitted without downlink OFDMA; and
wherein the first stream input comprises a packet that has a preamble section followed by a payload section, said pre-coding of the packet starts from a Legacy Long Training Field (L-LTF) included in the preamble section, and said pre-coding of the packet is not applied to a Legacy Short Training Field (L-STF) included in the preamble section.

7. The wireless communications apparatus of claim 6, wherein the pre-coded stream outputs comprise a first pre-coded stream output that is derived from said pre-coding of the first stream input, and downlink OFDMA is further involved in said wireless transmission of the first pre-coded stream output.

8. The wireless communications apparatus of claim 7, wherein the pre-coded stream outputs further comprise a second pre-coded stream output that is derived from said pre-coding of the second stream input, downlink OFDMA is not involved in said wireless transmission of the second pre-coded stream output, and the first pre-coded stream output and the second pre-coded stream output are transmitted via different antennas, respectively.

9. The wireless communications apparatus of claim 6, wherein each of the first wireless communications standard and the second wireless communications standard is a Wireless Local Area Network (WLAN) standard.

10. The wireless communications apparatus of claim 9, wherein the first wireless communications standard is an Institute of Electrical and Electronics Engineers (IEEE) 802.11ac standard, and the second wireless communications standard is an IEEE 802.11ax standard.

* * * * *